United States Patent
Blakemore

(12) 
(10) Patent No.: US 6,951,443 B1
(45) Date of Patent: *Oct. 4, 2005

(54) WIND TURBINE RING/SHROUD DRIVE SYSTEM

(75) Inventor: Ralph W. Blakemore, Tehachapi, CA (US)

(73) Assignee: General Electric Company, Schenectady, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/657,883

(22) Filed: Sep. 8, 2000

(51) Int. Cl.[7] ................................................ F03D 7/02
(52) U.S. Cl. ..................... 415/4.3; 415/4.5; 415/155; 415/159; 415/908; 416/196 A; 416/DIG. 4
(58) Field of Search ................... 415/4.3, 4.5, 155, 415/159, 160, 161, 908; 416/196 A, 160, 416/193 R, DIG. 4, 132 B; 290/55

(56) References Cited

U.S. PATENT DOCUMENTS

| | | | | |
|---|---|---|---|---|
| 2,670,050 A | * | 2/1954 | Enos | 416/193 R |
| 4,150,301 A | * | 4/1979 | Bergey, Jr. | 416/DIG. 4 |
| 4,330,714 A | * | 5/1982 | Smith | 290/55 |
| 5,213,470 A | * | 5/1993 | Lundquist | 416/9 |

FOREIGN PATENT DOCUMENTS

WO    WO-87/05666    * 9/1987

* cited by examiner

Primary Examiner—Edward K. Look
Assistant Examiner—Dwayne J. White
(74) Attorney, Agent, or Firm—Blakely, Sokoloff, Taylor & Zafman LLP

(57) ABSTRACT

A wind turbine capable of driving multiple electric generators having a ring or shroud structure for reducing blade root bending moments, hub loads, blade fastener loads and pitch bearing loads. The shroud may further incorporate a ring gear for driving an electric generator. In one embodiment, the electric generator may be cantilevered from the nacelle such that the gear on the generator drive shaft is contacted by the ring gear of the shroud. The shroud also provides protection for the gearing and aids in preventing gear lubricant contamination.

19 Claims, 3 Drawing Sheets

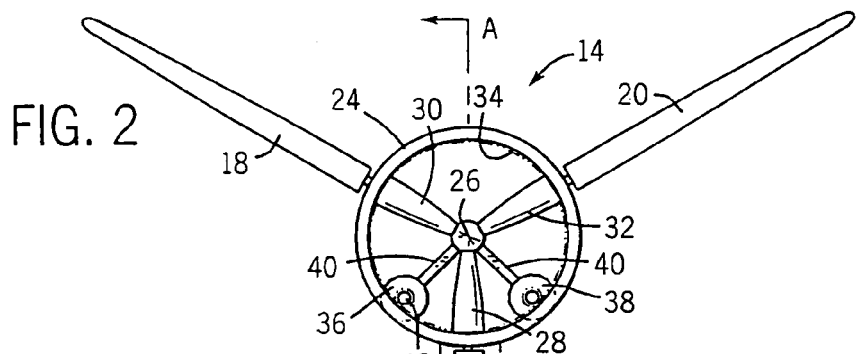
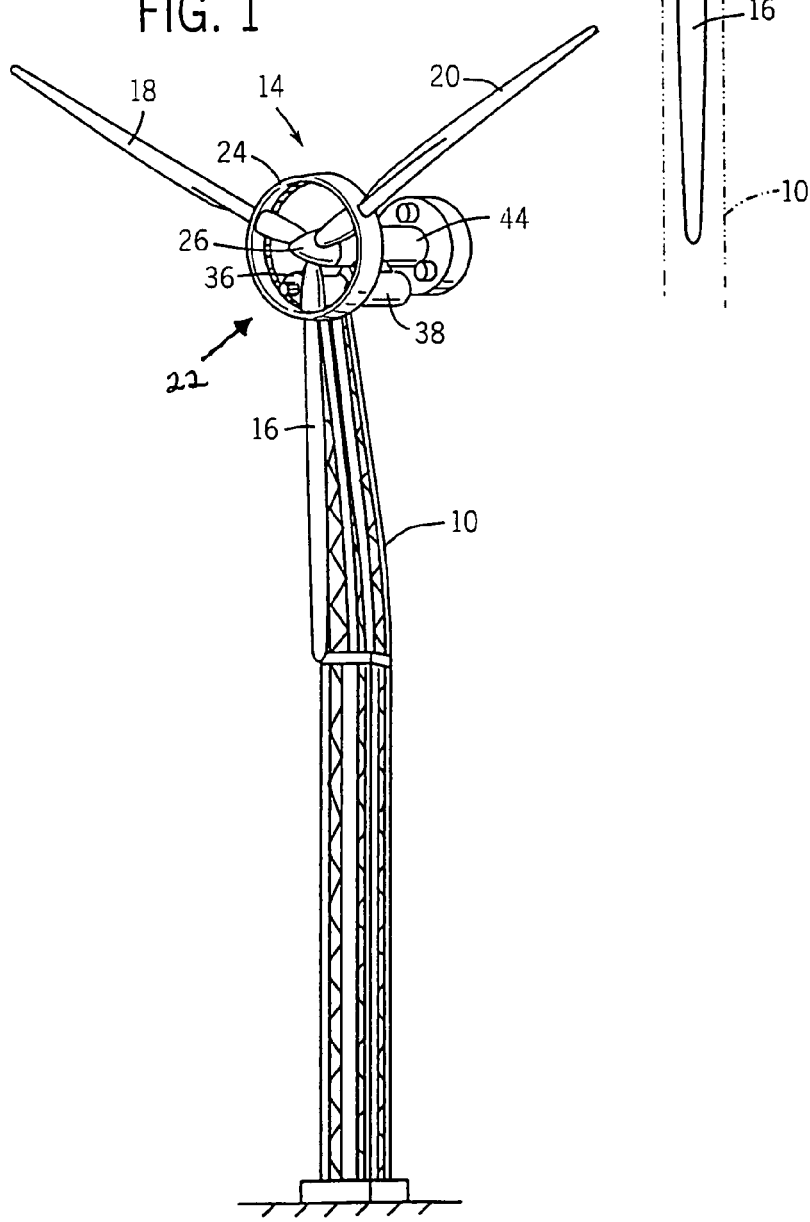

WIND TURBINE RING/SHROUD DRIVE SYSTEM

GOVERNMENT INTEREST

This Invention was made with Government support under NREL Subcontract No. ZAM-7-13320-26, Prime Contact DE-AC36-83CH10093 awarded by the Department of Energy. The Government has certain rights in this Invention.

BACKGROUND OF THE INVENTION

1. Field of the Invention

The subject invention is related to wind turbines and is specifically directed to shroud and ring gear drive configurations for reducing gear tooth loading and thereby increasing gearbox torque transmission capability by reducing gear tooth tangential force.

2. Description of the Prior Art

Wind turbines, like other energy conversion devices, require fuel. It is the quantity of fuel available to the device and the overall conversion efficiency that ultimately determine the net power output. In the case of a wind turbine, air is the fuel. The quantity of air available to the turbine is determined by the diameter of the rotor and the elevation at which the rotor is positioned. A large diameter turbine rotor located atop an extremely tall tower has more air available to it due to increases in mean wind speed and swept rotor area. A consequence of this factor is that rotor, drive train and tower loads increase.

Upwind rotor designs currently in use are not operated at optimum structural efficiency. Rotor power ratings are largely influenced by blade tip to tower clearance limitations, materials of construction, and quality of workmanship. Any given rotor design can be maximized to provide optimum power output if adequate tower clearance is provided.

It is a goal of the wind turbine industry to be able to produce power at competitive rates, with the current target cost of energy ("COE") being in the range of $0.025/kWh to $0.029/kWh. Current technology generally has a COE of over $0.035/kWh. Therefore, in order to achieve the target COE, a novel configuration is required.

From the viewpoint of addressing only wind turbine design to achieve a low COE, two parameters can be optimized to produce the lowest possible COE. These are the cost of turbine hardware and the turbine performance. Hardware costs directly affect the initial capital cost and turbine performance is directly related to net annual energy production. In order to reach the goal of $0.025/kWh wind power electrical energy production, innovative configuration changes in traditionally designed wind turbines is required.

SUMMARY OF THE INVENTION

The present invention is directed to one aspect of a new wind turbine configuration and is specifically focused on a novel ring/shroud concept. Two embodiments are disclosed, and in each a tubular monocoque housing is substituted for the traditional box shaped fiberglass nacelle. In the exemplary embodiments described herein the monocoque housing is typically made of steel or other rigid material and is three to five meters in diameter and eight to twelve meters in length.

The housing provides support for the bearings that carry the turbine rotor and the shroud/ring drive of the subject invention. The monocoque structure eliminates the bedplate mounting structure generally found in large wind turbines. The housing also protects any electronics and power conditioning equipment located at tower top. The shaft extension drives the shroud/ring gear of the subject invention, resulting in both cost and weight savings.

The tower is tilted or articulated to form an arched tower, permitting the turbine rotor to be placed in a higher velocity, low turbulence air stream with reduced wind shear gradient. Using an arched tower that rotates about its base accommodates the increased blade tip deflection. Drive train loads are reacted through the tubular monocoque housing that replaces both the traditional bedplate and the nacelle. In the embodiments shown and described herein the tower can be in the range of 100 meters in height.

In the preferred embodiment, the shroud comprises a circular ring that is connected to the turbine hub and blades. An interconnecting ring reduces blade root bending moments and provides a shroud, or cover, for a ring gear that is used to drive one or more generators, pumps, or other devices utilizing rotating input. The shroud also forms an enclosure that prevents contamination of the gear lubricant. The shroud may or may not include the ring gear. In fact, the shroud may be used independently of the ring gear to reduce blade root bending moments, blade fastener and pitch bearing loads.

In a first embodiment, the generators are cantilevered from the monocoque nacelle. The ring gear interfaces with a pinion gear directly mounted on the shaft of each generator. Low speed commercially available generators can be used in the system. The generator is not integrally mounted to the ring gear structure and gear alignment is an important design consideration of the shroud ring design of the subject invention. Pitch riding retainers or other devices with compliant generator mounting are utilized. This also has the added benefit of reducing conducted noise and insulates the generator from electrostatic discharge and stray eddy current conduction. This embodiment lends itself to the incorporation of a direct drive generator.

In a second, preferred, embodiment, a completely closed housing is rigidly attached to the monocoque nacelle. The turbine rotor shaft extends from the housing opposite the rotor end. The housing provides integral support for generator mounting, prevents contamination of the gear lubricant, and ensures gear alignment. This embodiment also permits the addition of a second stage of speed increase gearing where it is determined that there is a favorable cost and performance trade-off between generator speed and number of gears used. While this embodiment includes a number of gears approaching the number found in traditionally used multi-stage planetary/helical gearboxes, low cost readily available stock gearing can be used. This embodiment also lends itself to the incorporation of a direct drive generator.

The overall purpose of the invention is to provide a wind turbine capable of driving multiple electric generators. Utilizing the shroud/ring of the subject invention, the wind turbine is modified to include a circular ring that is connected to the turbine hub and blades. The interconnecting ring reduces blade root bending moments and provides a shroud or cover for a ring gear that is used to drive one or more generators. The shroud also forms an enclosure that prevents contamination of the gear lubricant. The generator(s) may be cantilevered from the nacelle such that the ring gear interfaces with a pinion gear directly mounted on the shaft of each generator. In this way any number of generators may be mounted such that they are driven by the ring gear. The shroud may also be used without a ring gear to reduce blade root bending moments, blade fastener load and pitch bearing loads.

Typically, the shroud is mounted between a first set of turbine blades or connecting structure and a second set of turbine blades.

In the alternate embodiment, a completely closed housing may be rigidly attached to the nacelle. The housing provides integral support for mounting any suitable number of electric generators. The housing also prevents contamination of the gear oil and ensures proper gear alignment. Additionally, a second stage of speed increase gearing may be added, thus allowing increased overall speed increase ratios.

It is an object and feature of the subject invention to provide a ring/shroud drive resulting in reduced blade root bending moment, allowing for significant reduction of the laminated material for the root region of the blade and allowing for the use of low cost blade attachment hardware.

It is another object and feature of the subject invention to provide a ring/shroud drive permitting the use of small diameter, standard rolling element blade pitch bearings.

It is also an object and feature of the subject invention to provide a standardized ring/shroud and hub geometry for a given family of turbines, wherein blades of various geometries may be easily adapted to the assembly, permitting complete interchangeability of blade configurations.

Other objects and features of the invention will be readily apparent from the accompanying drawings and detailed description of the preferred embodiments.

BRIEF DESCRIPTION OF THE DRAWINGS

FIG. 1 is a perspective view of an overall wind turbine system utilizing the configuration of the subject invention.

FIG. 2 is a front view of the ring/shroud in accordance with the subject invention.

DETAILED DESCRIPTION OF THE PREFERRED EMBODIMENTS

Figure 3:
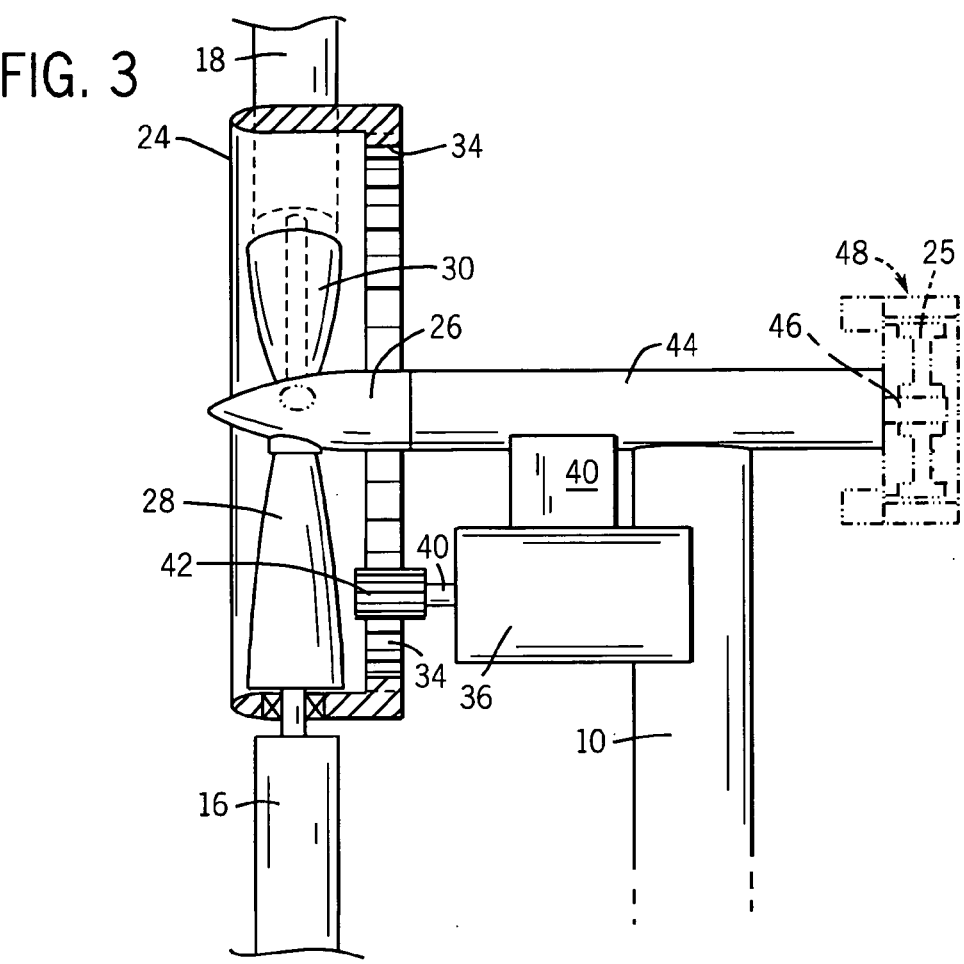
FIG. 3 is a section view taken along the line A—A of FIG. 2.
Figure 5:
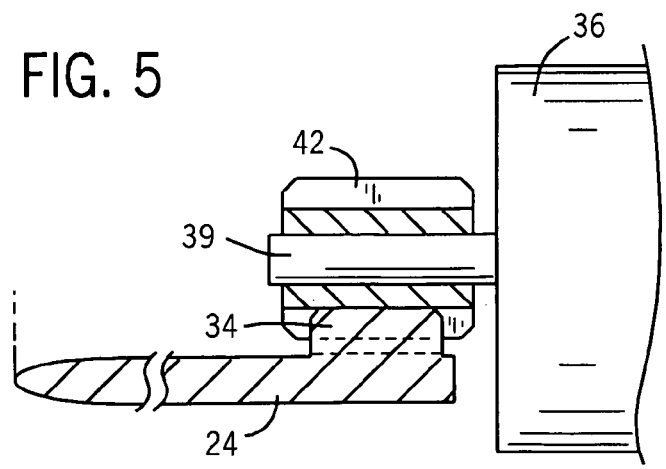
FIG. 5 is an enlarged, fragmentary view looking in the same direction as FIG. 3 and shows the gearing for driving the generator.

The overall system design is shown in FIG. 1. FIG. 1 illustrates the tower 10 and the housing 44. The subject invention is specifically directed to the ring/shroud 14 and the connection assembly thereof for the blades 16, 18 and 20 and the generator assembly 22. An enlarged front view of the ring/shroud 14 is shown in FIG. 2. The outer ring 24 is concentric with a hub 26 and is connected thereto via permanently mounted interior blades or other interconnecting structure 28, 30 and 32 (also see FIG. 3). The interior blades may be either fixed or variable pitch. In the preferred embodiment, the shroud includes a gear track or race 34 about its perimeter, see FIG. 3. The track can be on the inner perimeter as shown in FIGS. 3 and 5, or can be along the outer perimeter, as a matter of choice. In the preferred embodiment, one or more generators 36, 38 are mounted on struts 40 that extend radially outward from the nacelle 44. As is better shown in the enlarged fragmentary view FIG. 5 also looking generally in the same direction as FIG. 3. the drive shaft 39 of each generator includes a drive gear (or gears) 42 in driven relationship with the track 34 of the shroud ring 24.

Figure 4:
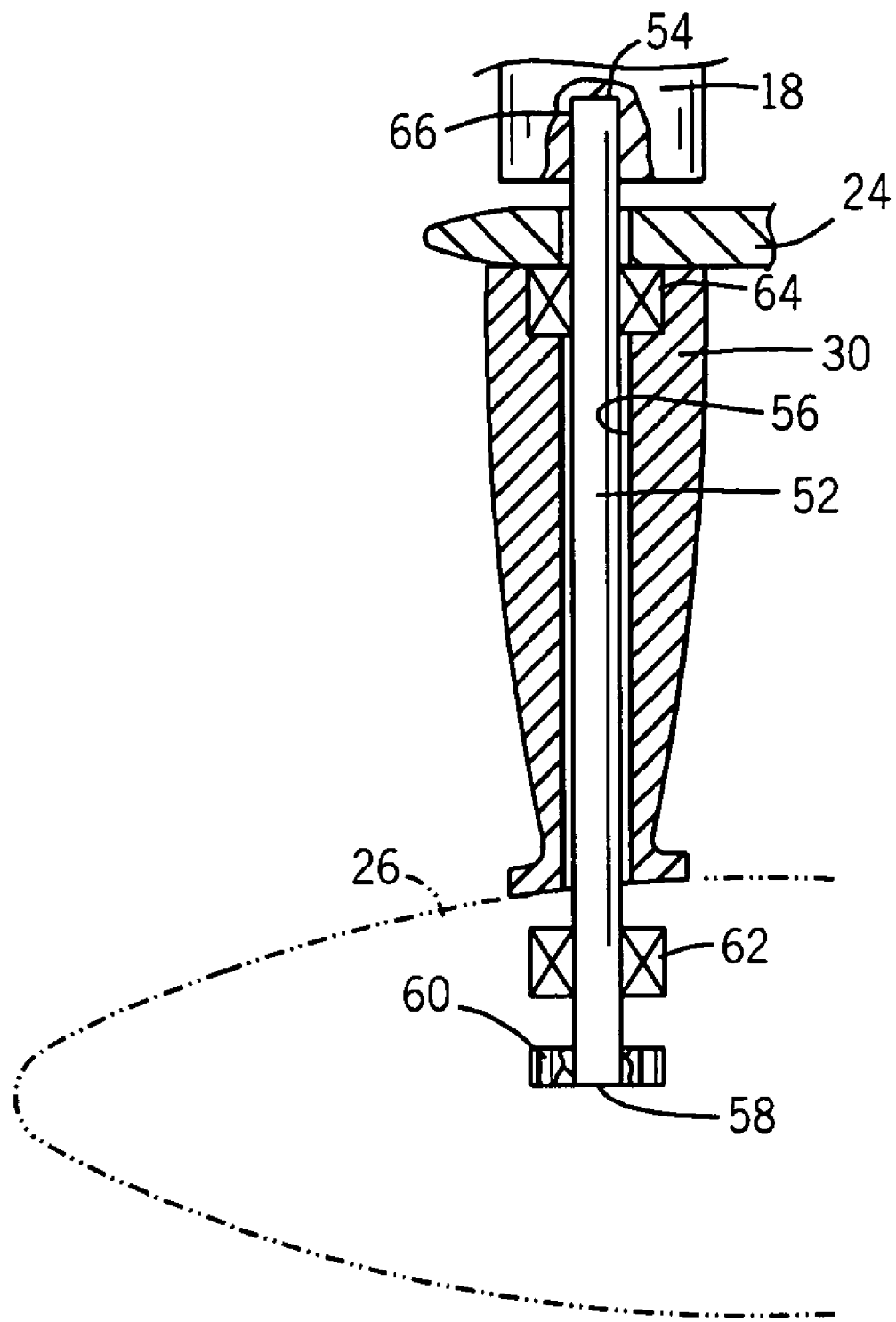
FIG. 4 is an enlarged, fragmentary view looking in the same direction as FIG. 3 and shows the axle and ring configuration for connecting the outer blade.

The assembly for attaching the outer blades to the ring 24 is better shown in FIG. 4, which is looking generally in the same direction as FIG. 3. As there shown, a mounting shaft 52 extends from the hub 26 through the ring 24 and has an outer mounting end 54. In the preferred embodiment the mounting shaft 52 is carried in a through channel 56 in the associated interior blade or structure 30. The inner end 58 of the mounting shaft 52 is connected to and is the drive shaft of the pitch change gear motor 60 for the associated outer blade, in this case blade 18. The gear motor may be mounted directly in the hub 26, or elsewhere as desired, with suitable gearing assemblies as well known.

Suitable bearing assemblies 62, 64 are provided in the inner blade or structure 30 and the hub 26 to permit passage and support of the drive shaft 52. As previously discussed, the inner blade may be of fixed or variable pitch. When fixed, the blade is connected directly to the ring and/or hub and the drive shaft is mounted to rotate freely relative thereto. When variable, the blade is connected to the drive shaft 52 and is free of the ring 24 and hub 26.

The outer mounting end 54 of the drive shaft 52 defines a mounting post for the associated outer blade 18. The outer blade 18 includes a mounting socket or receptacle 66 for receiving the post and the blade and post are fixedly secured to one another in well known manner. Of course, it will be readily understood that each outer blade could be secured directly to the ring 24 as a fixed pitch blade without departing from the scope and spirit of the invention.

When the ring is not used as the drive gear for the generator(s), the ring does not have to be of circular design but may be other polygonal configurations. By placing the blade mounting post on or through the ring, any of a plurality of a family of blades may be attached to the system without dismantling the hub. As described, the ring is connected to the turbine hub by the inner blades or structure and connected to the outer blades by the mounting post assembly. The interconnecting structure reduces blade root bending moments and promotes load sharing between the blades. The structure also serves as a shroud or cover for the drive gear or track that is used to drive the one or more generators. The shroud forms an enclosure that prevents contamination of the gear lubricant by the elements.

As stated, the shroud does not necessarily have to incorporate the generator drive gear. Used alone, it still is functional to reduce blade root bending moments and blade fastener, hub and pitch bearing loads.

In the preferred embodiment, when the drive gear is mounted to the shroud, each generator is cantilevered from the nacelle structure. This also permits use of a plurality of generators, rather than one in alignment with hub shaft. In order to accommodate the cantilevered mounting wherein the generator is not integrally mounted to the ring structure, pitch riding retainers or other devices with compliant pinion and generator mounting is required. This will provide the added benefits of reducing conducted noise and insulating each generator from electrostatic discharge and stray eddy current conduction. Alternatively, a direct drive generator can be incorporated by mounting elements of the generator on both the hub shroud assembly and the monocoque housing.

An alternative to the above described concept will include a completely closed housing that is rigidly attached to the nacelle structure. The housing provides integral support for the generator mounting, prevents contamination of the gear lubricant and ensures gear alignment between the turbine rotor shaft driven gear and the generator gearing. The nacelle 44 houses the inner rotor bearing assembly (not shown) for supporting a drive shaft 46 that is connected to the drive gear assembly 25, shown in phantom, inside the drive gear housing 48. The inner rotor bearing assembly, drive shaft 46 and drive gear 25 are well known in the art. The drive gear 25 (see FIG. 3) rotates with the blades and hub. The drive gear housing 48 is held stationary by reacting the torsional loads of the structure back to the nacelle structure. This approach ensures drive gear-to-generator alignment. The drive gear meshes with a driven gear or gears mounted on the shaft of each generator. Commercially available generators can be used. This also has the potential for adding a second stage of speed increase gearing if it is determined that there is a favorable cost and performance trade-off between generator speed and the number of gears used.

While certain features and embodiments of the invention have been described in detail herein, it will be understood that the invention includes all improvements, modifications and enhancements within the scope and spirit of the following claims.

What is claimed is:

1. A shroud system for a wind turbine comprising:
   a. a central hub;
   b. a first connecting structure having a root portion and a tip portion, wherein said root portion is attached to the hub;
   c. a shroud having an internal surface, an external surface, and a ring gear to drive a generator, wherein the internal surface is attached to the tips of the connecting structure;
   d. a second set of connecting structure having a root portion and a tip portion, wherein said root portion is attached in such a manner as to extend beyond the external surface of the shroud; and
   e. a nacelle having a strut to affix the generator.
2. The shroud system of claim 1, wherein the ring gear is on the internal surface of the shroud.
3. The shroud system of claim 1, wherein the shroud is a circular ring.
4. The shroud system of claim 1, wherein the shroud is a polygonal shape.
5. The shroud system of claim 1, wherein the connecting structure comprises blades.
6. The shroud system of claim 5, wherein the second set of blades is attached directly to the external surface of the shroud when the blades are fixed pitch.
7. The shroud system of claim 5, further including a plurality of rotatable drive shafts extending radially outward from the external surface of the shroud in one-to-one correspondence with the second set of blades for supporting each blade in variable pitch configuration.
8. The shroud system of claim 5, wherein the second set of blades are of variable pitch.
9. The shroud system of claim 5, wherein the first set of blades is mounted in a fixed relationship with a mounting post for providing a variable pitch blade.
10. The shroud system of claim 1, further comprising:
    a. a plurality of rotatable mounting posts in one-to-one relationship with the second set of blades and extending radially outward from the shroud for supporting each of the second set of blades; and
    b. a control motor for driving each post and controlling the angular position thereof for determining the pitch of the second set of blades.
11. The shroud system of claim 10, wherein each mounting post extends through the shroud and to the hub.
12. The shroud system of claim 11, wherein the control motor is mounted within the hub.
13. The shroud system of claim 11, wherein the mounting post is carried within a corresponding of the first set of blades.
14. The shroud system of claim 13, wherein the first set of blades is mounted in a fixed relationship with the shroud for providing a fixed pitch blade.
15. A wind turbine comprising:
    a. a tower;
    b. a nacelle mounted on said tower;
    c. a hub mounted for rotation on a shaft supported within the nacelle;
    d. a plurality of first rotor blades, said blades having a root end and a tip end, wherein the first rotor blades or structures are attached at said root end to a hub and said hub being secured to said shaft extending from the nacelle, the nacelle having a strut to affix a generator;
    e. a shroud having an internal surface and an external surface, wherein the internal surface of the shroud is attached to the tip ends of said first rotor blades or structures, the shroud having a ring gear for driving at least one generator; and
    f. a plurality of second rotor blades, said blades having a root end and a tip end, wherein the root ends of the second rotor blades attach to the external surface of the shroud when the second rotor blades have a fixed pitch and the root ends of the second rotor blades attach to a drive shaft when the second rotor blades have a variable pitch.
16. The wind turbine of claim 15, further comprising: a driven gear on the generator and in engagement with the ring gear on the shroud.
17. A wind turbine comprising:
    a. a tower;
    b. a nacelle having a support strut extending therefrom, said nacelle being mounted on said tower;
    c. the nacelle further including a support shaft extending therefrom;
    d. a generator incorporating a gear and being mounted on said support strut;
    e. plurality of first rotor structures having a root end and a tip end, wherein the first rotor structures are attached at said root end to a hub and said hub being secured to said shaft extending from the nacelle;
    f. a shroud having an internal surface and an external surface, wherein the internal surface of the shroud is attached to the tip ends of said first fixed pitch rotor structure and wherein said shroud further includes a ring gear for interfacing the generator; and
    g. a plurality of second rotor structures having a root end and a tip end, wherein the root ends of the second rotor structures attach to the external surface of the shroud when the second rotor structures have a fixed pitch.
18. The wind turbine of claim 17, wherein the rotor structures are blades.
19. The shroud system of claim 17, wherein the ring gear is on the external surface of the shroud.

* * * * *